United States Patent
McGill, Jr. et al.

(10) Patent No.: US 11,724,691 B2
(45) Date of Patent: Aug. 15, 2023

(54) SYSTEMS AND METHODS FOR ESTIMATING THE RISK ASSOCIATED WITH A VEHICULAR MANEUVER

(71) Applicants: Toyota Research Institute, Inc., Los Altos, CA (US); Massachusetts Institute of Technology, Cambridge, MA (US)

(72) Inventors: Stephen G. McGill, Jr., Broomall, PA (US); Guy Rosman, Newton, MA (US); Moses Theodore Ort, Lakewood, NJ (US); Alyssa Pierson, Somerville, MA (US); Igor Gilitschenski, Cambridge, MA (US); Minoru Brandon Araki, Cambridge, MA (US); Luke S. Fletcher, Cambridge, MA (US); Sertac Karaman, Cambridge, MA (US); Daniela Rus, Weston, MA (US); John Joseph Leonard, Newton, MA (US)

(73) Assignees: Toyota Research Institute, Inc., Los Altos, CA (US); Massachusetts Institute of Technology, Cambridge, MA (US)

( * ) Notice: Subject to any disclaimer, the term of this patent is extended or adjusted under 35 U.S.C. 154(b) by 310 days.

(21) Appl. No.: 16/440,546

(22) Filed: Jun. 13, 2019

(65) Prior Publication Data
US 2020/0086859 A1    Mar. 19, 2020

Related U.S. Application Data

(60) Provisional application No. 62/731,892, filed on Sep. 15, 2018.

(51) Int. Cl.
*B60W 30/09* (2012.01)
*G05D 1/00* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ............... B60W 30/09; B60W 30/095; B60W 30/0953; B60W 30/0956; B60W 30/08;
(Continued)

(56) References Cited

U.S. PATENT DOCUMENTS 10,290,116 B2 * 5/2019 Laugier .................. G06V 20/58
10,872,379 B1 * 12/2020 Nepomuceno ....... G08G 1/0141
(Continued)

OTHER PUBLICATIONS

Althoff, Comparison of Markov Chain Abstraction and Monte Carlo Simulation for the Safety Assessment of Autonomous Cars, IEEE, pp. 1-11 (Year: 2011).*
(Continued)

*Primary Examiner* — Hunter B Lonsberry
*Assistant Examiner* — Matthew J. Reda
(74) *Attorney, Agent, or Firm* — Christopher G. Darrow; Darrow Mustafa PC

(57) ABSTRACT

Systems and methods described herein relate to estimating risk associated with a vehicular maneuver. One embodiment acquires a geometric representation of an intersection including a lane in which a vehicle is traveling and at least one other lane; discretizes the at least one other lane into a plurality of segments; determines a trajectory along which the vehicle will travel; estimates a probability density function for whether a road agent external to the vehicle is present in the respective segments; estimates a traffic-conflict probability of a traffic conflict in the respective segments conditioned on whether an external road agent is present; estimates a risk associated with the vehicle follow-
(Continued)

ing the trajectory by integrating a product of the probability density function and the traffic-conflict probability over the at least one other lane and the plurality of segments; and controls operation of the vehicle based, at least in part, on the estimated risk.

20 Claims, 9 Drawing Sheets

(51) Int. Cl.
G05D 1/02 (2020.01)
B60W 10/20 (2006.01)
B60W 10/04 (2006.01)
B60W 10/18 (2012.01)
B60W 40/04 (2006.01)

(52) U.S. Cl.
CPC ............ *B60W 40/04* (2013.01); *G05D 1/0088* (2013.01); *G05D 1/0214* (2013.01); *B60W 2420/52* (2013.01); *B60W 2420/54* (2013.01); *B60W 2520/10* (2013.01); *B60W 2554/00* (2020.02); *B60W 2710/18* (2013.01); *B60W 2710/20* (2013.01); *B60W 2720/106* (2013.01)

(58) Field of Classification Search
CPC ......... B60W 30/085; B60W 30/18154; B60W 30/18159; B60Y 2300/0952; B60Y 2300/0954; G05D 1/0088
See application file for complete search history.

(56) References Cited

U.S. PATENT DOCUMENTS

| | | | | |
|---|---|---|---|---|
| 2014/0375810 | A1* | 12/2014 | Rodriguez | B60Q 1/50 348/148 |
| 2017/0225710 | A1* | 8/2017 | Yu | B60W 30/20 |
| 2018/0037162 | A1* | 2/2018 | Yonezawa | G08G 1/0141 |
| 2018/0099663 | A1* | 4/2018 | Diedrich | B60W 30/09 |
| 2018/0231974 | A1 | 8/2018 | Eggert et al. | |
| 2018/0293449 | A1* | 10/2018 | Sathyanarayana | G06K 9/6218 |
| 2018/0328745 | A1* | 11/2018 | Nagy | G01C 21/32 |
| 2018/0357904 | A1* | 12/2018 | Miyata | B60W 30/18163 |
| 2019/0208695 | A1* | 7/2019 | Graf Plessen | A01B 69/007 |
| 2019/0329763 | A1* | 10/2019 | Sierra Gonzalez | G08G 1/0962 |
| 2019/0337507 | A1* | 11/2019 | Stein | B60W 50/0097 |
| 2019/0337512 | A1* | 11/2019 | Tahmasbi-Sarvestani | G06K 9/00791 |
| 2019/0389470 | A1* | 12/2019 | Zarringhalam | B62D 6/008 |

OTHER PUBLICATIONS

Sun, Z et al., Simultaneous estimation of states and parameters in Newell's simplified kinematic wave model with Eulerian and Lagrangian traffic data, 2017 (Year: 2017).*
Choi, "Crash factors in intersection-related crashes: An on-scene perspective," National Highway Traffic Safety Administration, Tech. Rep., 2010.
Fletcher et al., "The MIT-Cornell collision and why it happened," Journal of Field Robotics, vol. 25, No. 10, pp. 775-807, 2008.
Schwarting et al., "Parallel autonomy in automated vehicles: Safe motion generation with minimal intervention," in "IEEE Intl. Conf. on Robotics and Automation (ICRA)" IEEE, 2017, pp. 1928-1935.
J. Caird and P. Hancock, "The perception of arrival time for different oncoming vehicles at an intersection," Ecological Psychology, vol. 6, No. 2, pp. 83-109, 1994.
L. Staplin, "Simulator and field measures of driver age differences in left-turn gap judgments," Transportation Research Record, vol. 1485, p. 49, 1995.

Yan et al., "Effects of major-road vehicle speed and driver age and gender on left-turn gap acceptance," Accident Analysis & Prevention, vol. 39, No. 4, pp. 843-852, 2007.
Mitsopoulos-Rubens, et al., "Comparing the gap acceptance and turn time patterns of novice with experienced drivers for turns across traffic," Proceedings of Driving Assessment Conference, University of Iowa, 2009.
De Winter, et al., "Left turn gap acceptance in a simulator: Driving skill or driving style?" in Proceedings Driving Simulation Conference 2009, Monaco, 2010.
Marti, et al., "Drivers' decision-making when attempting to cross an intersection results from choice between affordances," Frontiers in human neuroscience, vol. 8, p. 1026, 2015.
Ragland, et al., "Gap acceptance for vehicles turning left across on-coming traffic: implications for intersection decision support design," UC Berkeley: Safe Transportation Research & Education Center, 2006.
Tang, et al., "Turn prediction at generalized intersections," in Intelligent Vehicles Symposium (IV), 2015 IEEE. IEEE, 2015, pp. 1399-1404.
Tran, et al., "A left-turn driving aid using projected oncoming vehicle paths with augmented reality," in Proceedings of the 5th International Conference on Automotive User Interfaces and Interactive Vehicular Applications. ACM, 2013, pp. 300-307.
Levinson, et al., "Towards fully autonomous driving: Systems and algorithms," in Intelligent Vehicles Symposium (IV), 2011 IEEE. IEEE, 2011, pp. 163-168.
Cunningham, et al., "Mpdm: Multipolicy decision-making in dynamic, uncertain environments for autonomous driving," in Robotics and Automation (ICRA), 2015 IEEE International Conference on. IEEE, 2015, pp. 1670-1677.
Isele, et al., "Navigating occluded intersections with autonomous vehicles using deep reinforcement learning," arXiv preprint arXiv: 1705.01196, 2017.
Isele, et al., "Transferring autonomous driving knowledge on simulated and real intersections," arXiv preprint arXiv: 1712.01106, 2017.
Carlino, et al., "Auction-based autonomous intersection management," in Intelligent Transportation Systems—(ITSC), 2013 16th International IEEE Conference on. IEEE, 2013, pp. 529-534.
Dresner, et al., "A multiagent approach to autonomous intersection management," Journal of artificial intelligence research, vol. 31, pp. 591-656, 2008.
Qian, et al., "Priority-based coordination of autonomous and legacy vehicles at intersection," in Intelligent Transportation Systems (ITSC), 2014 IEEE 17th International Conference on. IEEE, 2014, pp. 1166-1171.
Milanés, et al., "Controller for urban intersections based on wireless communications and fuzzy logic," IEEE Transactions on Intelligent Transportation Systems, vol. 11, No. 1, pp. 243-248, 2010.
Lefevre, et al., "A survey on motion prediction and risk assessment for intelligent vehicles," Robomech Journal, vol. 1, No. 1, p. 1, 2014.
Lefevre, et al., "Risk assessment at road intersections: Comparing intention and expectation," in Intelligent Vehicles Symposium (IV), 2012 IEEE. IEEE, 2012, pp. 165-171.
Richter, et al., "Bayesian Learning for Safe High-Speed Navigation in Unknown Environments," in Proceedings of the International Symposium on Robotics Research (ISRR), 2015, pp. 325-341.
Sivaraman, et al., "Looking at vehicles on the road: A survey of vision-based vehicle detection, tracking, and behavior analysis," IEEE Transactions on Intelligent Transportation Systems, vol. 14, No. 4, pp. 1773-1795, 2013.
Petrovskaya, et al., "Model based vehicle detection and tracking for autonomous urban driving," Autonomous Robots, vol. 26, No. 2-3, pp. 123-139, 2009.
Coulter, "Implementation of the pure pursuit path tracking algorithm," Carnegie-Mellon UNIV Pittsburgh PA Robotics INST, Tech. Rep., 1992.
Smith, et al., "An invariant may drive the decision to encroach at unsignalized intersections," in Proceedings of the 5th International Driving Symposium on Human Factors in Driver Assessment and Design. University of Iowa, 2009.

(56) References Cited

OTHER PUBLICATIONS

Aoude, Georges S. et al. "Threat Assessment Design for Driver Assistance System at Intersections." 13th International IEEE Conference on Intelligent Transportation Systems, (2010) pp. 1855-1862.

Sun et al., "Simultaneous estimation of states and parameters in newells simplified kinematic wave model with Eulerian and Lagrangian traffic data" Transportation Research Part B: Methodological, vol. 104, pp. 106-122, 2017.

Troutbeck, et al., "Unsignalized intersection theory," Revised Monograph on Traffic Flow Theory, 1997.

Karaman et al., "Project-based, collaborative, algorithmic robotics for high school students: Programming self-driving race cars at mit", IEEE Integrated STEM Education Conference (ISEC), Mar. 2017.

Rusch, et al., "Augmented reality cues to assist older drivers with gap estimation for left-turns," Accident Analysis & Prevention, vol. 71, pp. 210-221, 2014.

Cooper et al., "Turning gap acceptance decision-making: the impact of driver distraction," Journal of safety research, vol. 33, No. 3, pp. 321-335, 2002.

N. H. T. S. A. U.S. Department of Transportation, "Fatality Analysis Reporting System (FARS) Encyclopedia," accessed Aug. 28, 2018. found at: https://www-fars.nhtsa.dot.gov.

Greenshields et al., "Traffic performance at urban street intersections," Yale Bureau Highway Traffic, Tech. Rep., 1946.

Brilon et al., "Useful estimation procedures for critical gaps," Transportation Research Part A: Policy and Practice, vol. 33, No. 3-4, pp. 161-186, 1999.

Lefevre et al. "Evaluating risk at road intersections by detecting conflicting intentions," in Intelligent Robots and Systems (IROS), 2012 IEEE/RSJ International Conference on. IEEE, 2012, pp. 4841-4846.

Troutbeck, "Estimating the mean critical gap," Transportation Research Record: Journal of the Transportation Research Board, No. 2461, pp. 76-84, 2014.

Ming-Yuan Yu et al., "Occlusion-Aware Risk Assessment for Autonomous Driving in Urban Environments," University of Michigan, Ann Arbor, Sep. 12, 2018, found at https://arxiv.org/pdf/1809.04629.pdf.

Eggert, "Predictive Risk Estimation for Intelligent ADAS Functions," 2014 IEEE 17th International Conference on Intelligent Transportation Systems (ITSC), Oct. 8-11, 2014. Qingdao, China, found at: https://www.researchgate.net/profile/Julian_Eggert/publication/269103149_Predictive_Risk_Estimation_for_Intelligent_ADAS_Functions/links/54872d5b0cf268d28f071d92/Predictive-Risk-Estimation-for-Intelligent-ADAS-Functions.pdf?origin=publication_detail.

Brechtel et al., "Probabilistic Decision-Making under uncertainty for Autonomous Driving using Continuous POMDPs," 2014 IEEE 17th International Conference on Intelligent Transportation Systems (ITSC), Oct. 8-11, 2014 Qingdao, China, found at https://www.researchgate.net/profile/Sebastian_Brechtel/publication/267040968_Probabilistic_Decision-Making_under_Uncertainty_for_Autonomous_Driving_using_Continuous_POMDPs/links/5443f7b30cf2a76a3ccd6a0d/.

Laugier et al., "Probabilistic Analysis of Dynamic Scenes and Collision Risk Assessment to Improve Driving Safety," Oct. 28, 2011, found at https://hal.inria.fr/file/index/docid/645046/filename/Paper_ITSMag_Published.pdf.

Shirazi et al. Looking at Intersections: A Survey of Intersection Monitoring, Behavior and Safety Analysis of Recent Studies, IEEE Transactions on Intelligent Transportation Systems, Aug. 2016.

Efrati, "Waymo's Foes: Left Turns and the Mean Streets of Phoenix", dated Oct. 3, 2017, found at: https://www.theinformation.com/articles/waymos-foes-left-turns-and-the-mean-streets-of-phoenix (accessed on Oct. 12, 2020).

Efrati, "Waymo's Big Ambitions Slowed by Tech Trouble", dated Aug. 28, 2018, found at: Available: https://www.theinformation.com/articles/waymos-big-ambitions-slowed-by-tech-trouble (accessed on Oct. 12, 2020).

Older, et al., "Traffic conflict studies in the united kingdom," in Proceedings: First Workshop on Traffic Conflicts, C. H. Finn Harald Admundsen, Ed., vol. 1, pp. 1-16.

Hancock et al., "Factors Influencing Dirver's Left Turn Decisions", Proceedings of the Human Factors Society 35th Annual Meeting 1991.

\* cited by examiner

SYSTEMS AND METHODS FOR ESTIMATING THE RISK ASSOCIATED WITH A VEHICULAR MANEUVER

CROSS-REFERENCE TO RELATED APPLICATION

This application claims the benefit of U.S. Provisional Patent Application No. 62/731,892, "Probabilistic Safety Metrics for Navigating Occluded Intersections" filed Sep. 15, 2018, which is incorporated by reference herein in its entirety.

STATEMENT REGARDING FEDERALLY SPONSORED RESEARCH OR DEVELOPMENT

This invention was made with government support under Grant No. 1723943 awarded by the National Science Foundation (NSF) and Grant No. N00014-18-1-2830 awarded by the Office of Naval Research (ONR). The government has certain rights in the invention.

TECHNICAL FIELD

The subject matter described herein relates in general to vehicles and, more specifically, to systems and methods for estimating the risk associated with a vehicular maneuver.

BACKGROUND

Due to the potential for cross-traffic and occluded views, intersections present one of the most challenging driving scenarios to both autonomous vehicles and parallel-autonomy vehicles whose control is shared between a human driver and, for example, an advanced driver-assistance system (ADAS). Current autonomous and parallel-autonomy systems for navigating intersections rely on detecting and tracking individual objects (e.g., other vehicles in cross-traffic) based on measured speed and heading. Such systems fail to account adequately for uncertainty caused by, for example, erroneous sensor data, occlusions, and driver inattentiveness.

SUMMARY

An example of a system for estimating the risk associated with a vehicular maneuver is presented herein. The system comprises one or more sensors to produce sensor data, one or more processors, and a memory communicably coupled to the one or more processors. The memory stores a risk estimation module including instructions that when executed by the one or more processors cause the one or more processors to acquire a geometric representation of an intersection, the geometric representation including a lane in which a vehicle is traveling and at least one other lane. The risk estimation module also includes instructions to discretize the at least one other lane into a plurality of segments. The risk estimation module also includes instructions to determine a trajectory along which the vehicle will travel relative to the intersection. The risk estimation module also includes instructions to estimate a probability density function for whether a road agent external to the vehicle is present in the respective segments in the plurality of segments based, at least in part, on the sensor data. The risk estimation module also includes instructions to estimate a traffic-conflict probability, as a result of the vehicle traveling along the trajectory, of a traffic conflict occurring in the respective segments in the plurality of segments conditioned on whether an external road agent is present in the respective segments in the plurality of segments. The risk estimation module also includes instructions to estimate a risk associated with the vehicle traveling along the trajectory by integrating a product of the probability density function and the traffic-conflict probability over the at least one other lane and the plurality of segments. The memory also stores a control module including instructions that when executed by the one or more processors cause the one or more processors to control operation of the vehicle based, at least in part, on the estimated risk.

Another embodiment is a non-transitory computer-readable medium for estimating the risk associated with a vehicular maneuver and storing instructions that when executed by one or more processors cause the one or more processors to acquire a geometric representation of an intersection, the geometric representation including a lane in which a vehicle is traveling and at least one other lane. The instructions also cause the one or more processors to discretize the at least one other lane into a plurality of segments. The instructions also cause the one or more processors to determine a trajectory along which the vehicle will travel relative to the intersection. The instructions also cause the one or more processors to estimate a probability density function for whether a road agent external to the vehicle is present in the respective segments in the plurality of segments based, at least in part, on sensor data. The instructions also cause the one or more processors to estimate a traffic-conflict probability, as a result of the vehicle traveling along the trajectory, of a traffic conflict occurring in the respective segments in the plurality of segments conditioned on whether an external road agent is present in the respective segments in the plurality of segments. The instructions also cause the one or more processors to estimate a risk associated with the vehicle traveling along the trajectory by integrating a product of the probability density function and the traffic-conflict probability over the at least one other lane and the plurality of segments. The instructions also cause the one or more processors to control operation of the vehicle based, at least in part, on the estimated risk.

Another embodiment is a method of estimating the risk associated with a vehicular maneuver, the method comprising acquiring a geometric representation of an intersection, the geometric representation including a lane in which a vehicle is traveling and at least one other lane. The method also includes discretizing the at least one other lane into a plurality of segments. The method also includes determining a trajectory along which the vehicle will travel relative to the intersection. The method also includes estimating a probability density function for whether a road agent external to the vehicle is present in the respective segments in the plurality of segments based, at least in part, on sensor data. The method also includes estimating a traffic-conflict probability, as a result of the vehicle traveling along the trajectory, of a traffic conflict occurring in the respective segments in the plurality of segments conditioned on whether an external road agent is present in the respective segments in the plurality of segments. The method also includes estimating a risk associated with the vehicle traveling along the trajectory by integrating a product of the probability density function and the traffic-conflict probability over the at least one other lane and the plurality of segments. The method also includes controlling operation of the vehicle based, at least in part, on the estimated risk.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The embodiments described herein address important weaknesses in existing autonomous and parallel-autonomy systems for navigating intersections. Instead of a Lagrangian approach in which individual objects such as other vehicles are detected and tracked, the embodiments described herein employ an Eulerian approach in which the system estimates, for each of a set of discrete locations in the vicinity of an ego vehicle, the probability that an object such as another vehicle is present at that location. Those probability estimates are propagated in time and used to estimate the risk associated with the ego vehicle traveling along a determined trajectory relative to the intersection. In this context, the "risk" is the risk that a traffic conflict will occur, if the vehicle proceeds along the determined trajectory. In this description, a "traffic conflict" is an undesirable or adverse event that occurs between an ego vehicle and at least one other vehicle. Examples of traffic conflicts include, without limitation, collisions, near-miss braking incidents, an unexpected need for sudden braking, an unexpected need for sudden steering (swerving, etc.), an uncomfortably small gap spacing between vehicles, or the threat of an accident from one or more other vehicles. Note that a "traffic conflict" is not limited to collisions.

Once the risk of traveling along the trajectory has been estimated, the operation of the ego vehicle can then be controlled based, at least in part, on the estimated risk. In some embodiments, the vehicle is controlled in an autonomous driving mode (e.g., automatically steered along the determined trajectory at a speed that is appropriate, given the situation and the estimated risk). In other embodiments, the estimated risk is used in conjunction with a parallel-autonomy mode in which control of at least some vehicle systems is shared between a human driver and an advanced driver-assistance system (ADAS). In some embodiments, the estimated risk is used to make "go/no-go" decisions and/or to permit the ego vehicle to "nudge" toward the intersection prior to the ego vehicle entering the intersection. In some embodiments, the estimated risk is used to assist the vehicle in clearing the intersection by augmenting acceleration, after the vehicle has entered the intersection.

Important advantages of at least some of the embodiments described herein are that the system accounts for scant or erroneous sensor data, occlusions, and driver inattentiveness. In this description, an "occlusion" is anything that interferes with the ability of a human driver to see other vehicles and/or interferes with the ability of a vehicle's sensors to detect objects in the environment. Examples of occlusions include, without limitation, buildings, vegetation, signs, and other vehicles. At least some of the embodiments described herein are particularly advantageous for navigating unsignalized intersections—intersections without traffic lights or stop signs.

Figure 1:
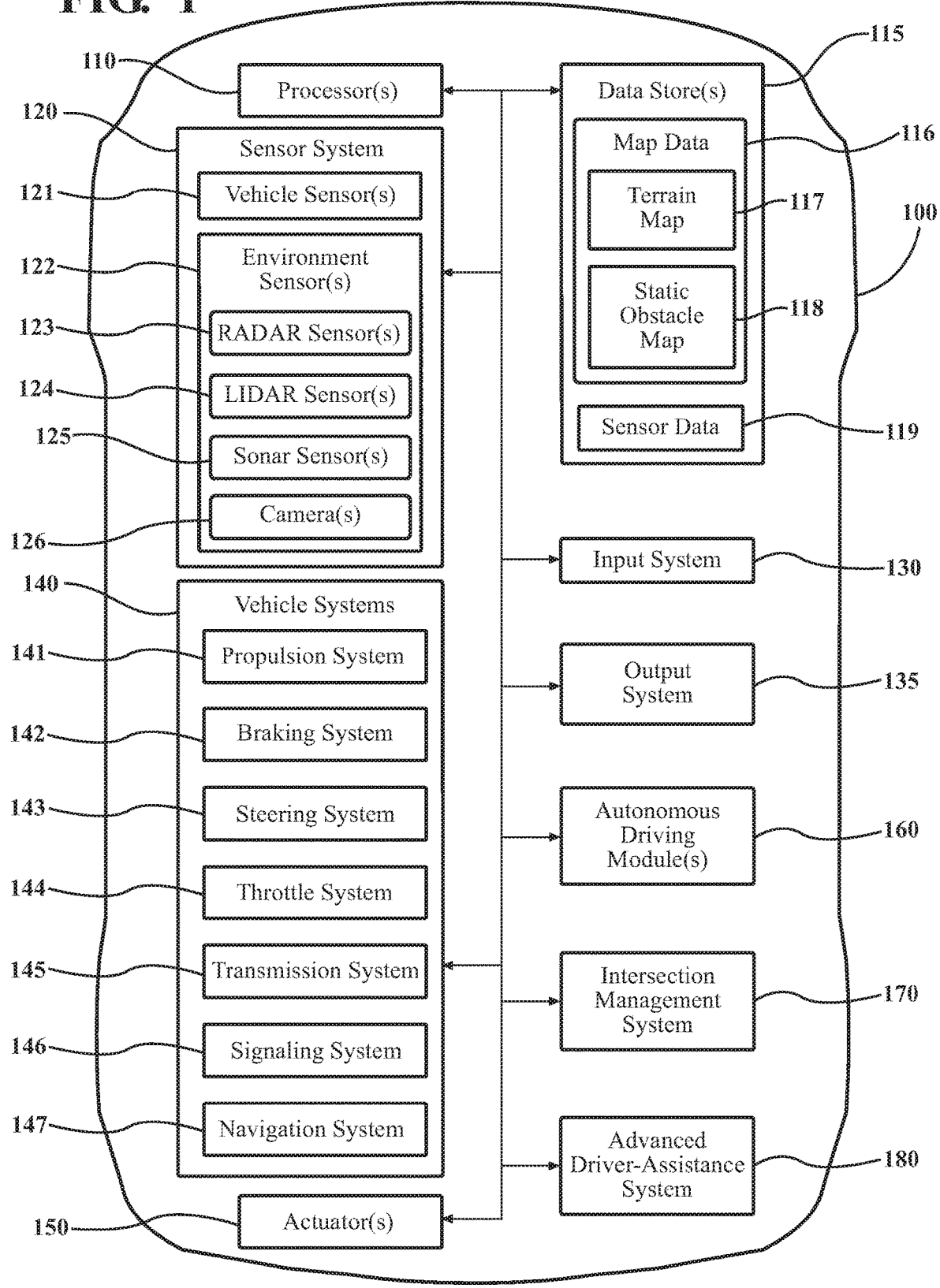
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes an intersection management system 170 that is implemented to perform methods and other functions as disclosed herein relating to estimating the risk associated with a vehicular maneuver. In some embodiments, intersection management system 170 interacts with and makes use of autonomous driving module(s) 160, advanced driver-assistance system (ADAS) 180, or both.

Figure 2:
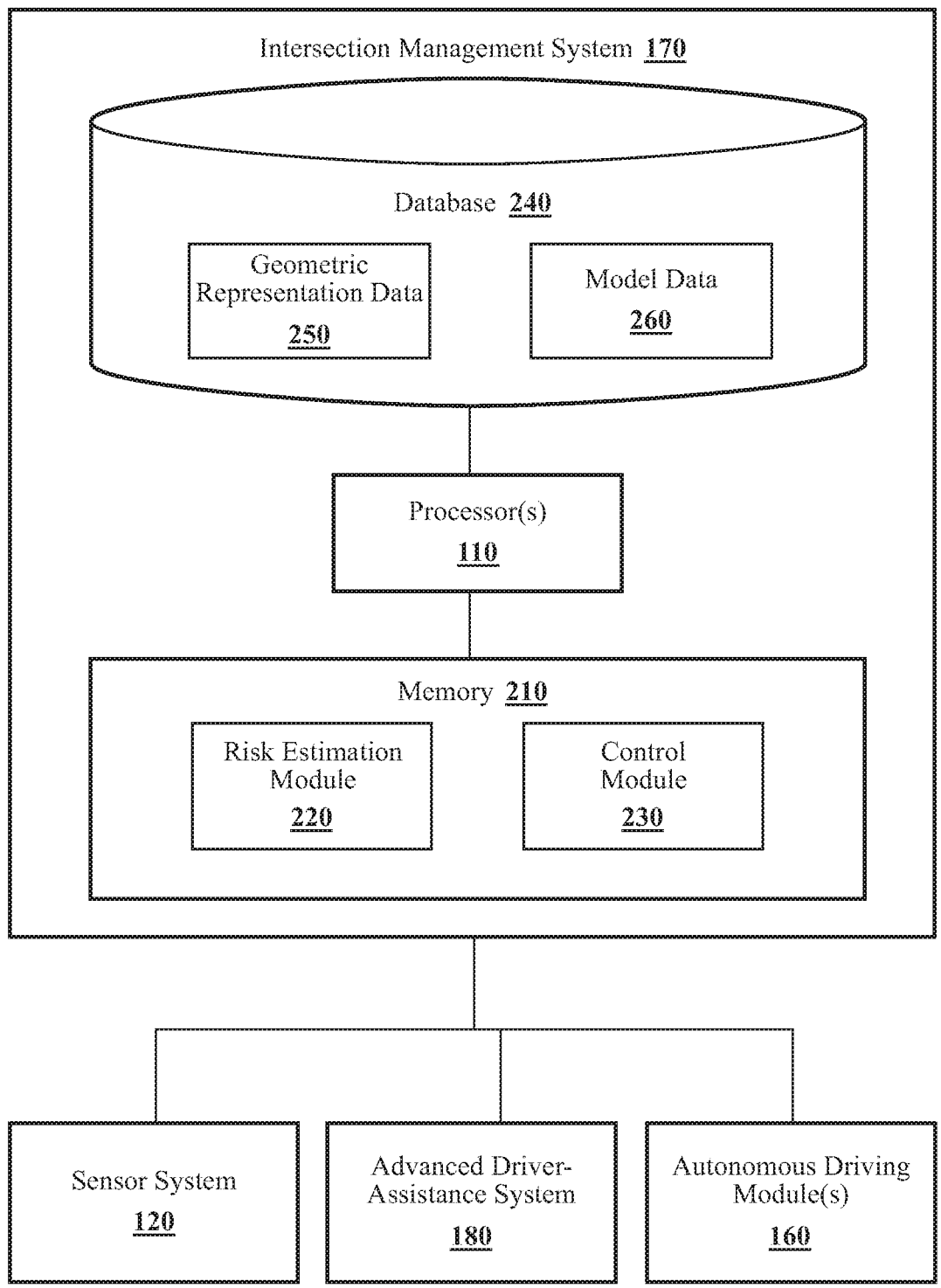
FIG. 2 illustrates one embodiment of a risk estimation module.

With reference to FIG. 2, one embodiment of the intersection management system 170 of FIG. 1 is further illustrated. The intersection management system 170 is shown as including one or more processors 110 from the vehicle 100 of FIG. 1. Accordingly, the one or more processors 110 may be a part of the intersection management system 170, the intersection management system 170 may include one or more separate processors from the one or more processors 110 of the vehicle 100, or the intersection management system 170 may access the one or more processors 110 through a data bus or another communication path, depending on the embodiment. In one embodiment, the intersection management system 170 includes a memory 210 that stores a risk estimation module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

In connection with estimating the risk of a vehicular maneuver by vehicle 100 (sometimes referred to herein as an "ego vehicle") and using that information to assist vehicle 100 in navigating intersections, intersection management system 170 can store geometric representation data 250 for intersections (discussed further below) and various kinds of model data 260 in database 240. As shown in FIG. 2, intersection management system 170 receives sensor data from sensor system 120. For example, in some embodiments, intersection management system 170 receives image data from one or more cameras 126. Intersection management system 170 may also receive Light Detection and Ranging (LIDAR) data from LIDAR sensors 124, radar data from radar sensors 123, and/or sonar data from sonar sensors 125, depending on the particular embodiment.

In some embodiments, intersection management system 170 receives information about planned routes and associated trajectories for vehicle 100 from navigation system 147 (see FIG. 1). In some embodiments, intersection management system 170 also receives inputs from vehicle systems 140 (see FIG. 1). Examples include, without limitation, steering wheel angle, gas pedal (accelerator) position, linear velocity, and angular velocity. Steering-wheel-angle and gas-pedal-position data are examples of what may be termed controller-area-network (CAN bus) data, and linear velocity and angular velocity are examples of what may be termed Inertial Measurement Unit (IMU) data. As also indicated in FIG. 2, intersection management system 170, in particular control module 230, can communicate with autonomous driving module(s) 160 and ADAS 180 to control, at least in part, certain aspects of the operation of vehicle 100 such as steering, acceleration, and braking.

Risk estimation module 220 generally includes instructions that cause the one or more processors 110 to estimate the risk associated with a vehicular maneuver. One example of such a maneuver is vehicle 100 traveling along a determined trajectory with respect to an intersection. One aspect of risk estimation module 220 is to acquire a geometric representation of an intersection, the geometric representation including a lane in which vehicle 100 is traveling and at least one other lane. Another aspect is discretizing the at least one other lane into a plurality of segments (this includes, in some embodiments, any lanes that vehicle 100 crosses over or enters). Another aspect is determining a trajectory along which vehicle 100 will travel relative to the intersection. Another aspect is estimating a probability density function for whether a road agent external to vehicle 100 is present in the respective segments based, at least in part, on sensor data from sensor system 120. In this description, the term "road agent" refers generally to any object that is capable of moving from place to place along or in a manner that intersects with a roadway. Such objects are not always necessarily in motion. In various embodiments, the road agents of interest are external to vehicle 100 (the "ego vehicle" or "host vehicle") in which an embodiment of the invention is installed and operating. Some examples of road agents include, without limitation, other vehicles of various types (automobiles, motorcycles, bicycles, trucks, construction equipment, etc.), pedestrians, and animals. A road agent external to an ego vehicle is sometimes referred to herein as an "external road agent."

Another aspect of risk estimation module 220 is estimating a traffic-conflict probability, as a result of vehicle 100 traveling along the determined trajectory, of a traffic conflict occurring in the respective segments conditioned on whether an external road agent is present in the respective segments. Yet another aspect of risk estimation module 220 is estimating the risk associated with vehicle 100 traveling along the determined trajectory by integrating the product of the probability density function and the traffic-conflict probability over the lanes and the plurality of segments. The various aspects of risk estimation module 220 mentioned above are described in greater detail below in connection with FIGS. 3-7.

Figure 3A:
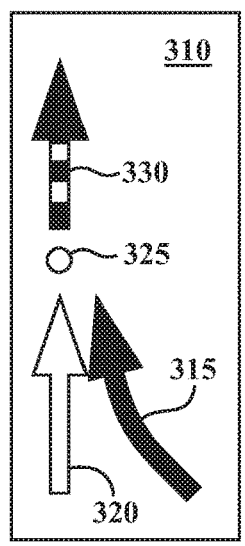
FIG. 3A illustrates a geometrical representation of a merge intersection, in accordance with an illustrative embodiment of the invention.
Figure 3B:
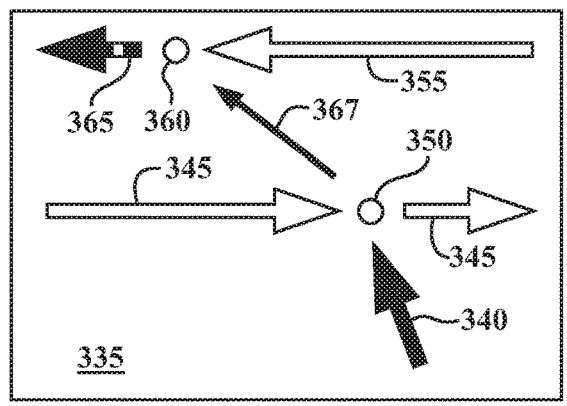
FIG. 3B illustrates a geometrical representation of an intersection at which a vehicle is to make a left turn, in accordance with an illustrative embodiment of the invention.
Figure 3C:
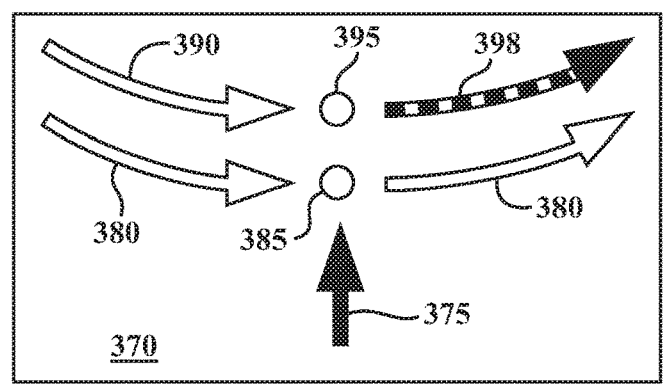
FIG. 3C illustrates a geometrical representation of a roundabout, in accordance with an illustrative embodiment of the invention.

As mentioned above, one aspect of risk estimation module 220 is acquiring a geometric representation of an intersection. FIGS. 3A, 3B, and 3C illustrate examples of geometric representations for three different kinds of intersections. Each of these figures includes (1) an original lane in which the ego vehicle (vehicle 100) is traveling before reaching the intersection; (2) one or more lanes over which the ego vehicle crosses ("crossed lanes"); (3) a lane origin (marked as a circle) with respect to which distances pertaining to the lane in question are measured; and (4) a new lane (the lane the ego vehicle ultimately enters or with which it merges).

FIG. 3A illustrates a geometrical representation of a merge intersection 310, in accordance with an illustrative embodiment of the invention. Within the analysis area (indicated by the rectangle) are original lane 315, crossed lane 320, lane origin 325, and new lane 330.

FIG. 3B illustrates a geometrical representation of an intersection 335 at which a vehicle 100 is to make a left turn, in accordance with an illustrative embodiment of the invention. Within the analysis area are original lane 340, crossed lane 345, lane origin 350, crossed lane 355, lane origin 360, new lane 365, and left-turn trajectory 367.

FIG. 3C illustrates a geometrical representation of a roundabout 370, in accordance with an illustrative embodiment of the invention. Within the analysis area are original lane 375, crossed lane 380, lane origin 385, crossed lane 390, lane origin 395, and new lane 398.

In other embodiments, the intersection can be, for example, a four-way intersection.

As mentioned above, another aspect of risk estimation module 220 is discretizing, into a plurality of segments, one or more lanes other than the original lane. In one embodiment, for an intersection of $n_l$ lanes, each lane $l \in \{1, \ldots, n_l\}$ is discretized into $n_s$ segments of length $\delta$ meters. For a segment i in lane l, the distance from the segment to the intersection is denoted $d_i$. In some embodiments, traffic in each lane l is modeled as having an average velocity, denoted $v_l$, such that for sampling intervals $\Delta t$, $\delta = v_l \Delta t$. The probability of vehicles entering a lane l can be modeled using a Poisson emission rate, denoted $\lambda_l$. For the ego vehicle (vehicle 100), its velocity is denoted as $v_e$ and its distance from the intersection as $d_e$.

Figure 4:
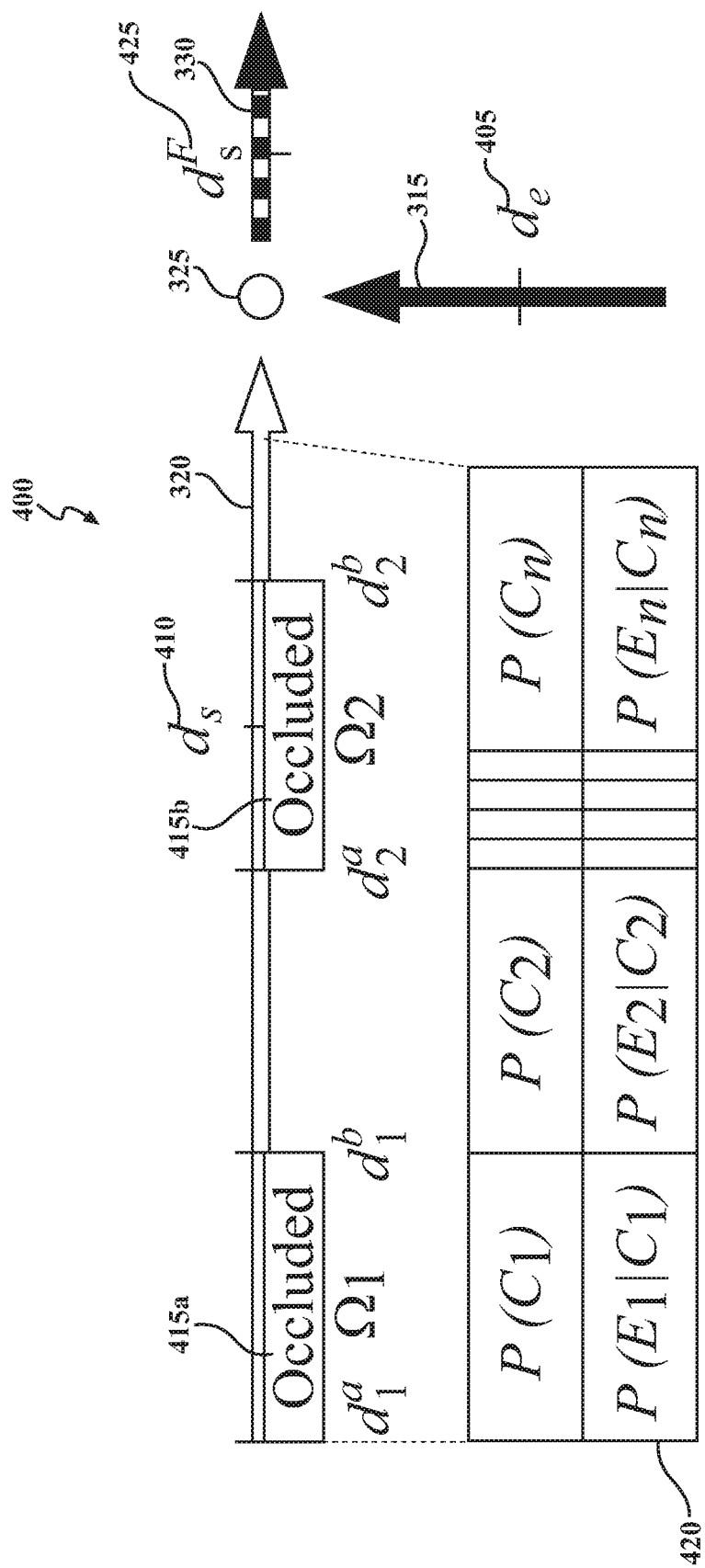
FIG. 4 illustrates a portion of a model for analyzing the risk associated with a vehicular maneuver at the merge intersection of FIG. 3A, in accordance with an illustrative embodiment of the invention.

FIG. 4 illustrates a portion of a model for analyzing the risk associated with a vehicular maneuver at the merge intersection 310 of FIG. 3A, in accordance with an illustrative embodiment of the invention. In FIG. 4, crossed lane 320 and new lane 330 have been divided into a plurality of segments, as discussed above (for clarity, not all segments are marked in FIG. 4). In the illustrated scenario, vehicle 100 is a certain distance 405 ($d_e$) from the intersection 310. As discussed further below in connection with driver attention, some embodiments include, in the model, a comfortable stopping distance 410 ($d_s$) for an external road agent traveling in crossed lane 320. As explained in greater detail below, this distance depends, in part, on the time $t_c$ it takes vehicle 100 to clear the intersection, which is a function of the path length through the intersection and the ego vehicle's velocity $v_e$. In the example of FIG. 4, occlusions are present in some segments, specifically occluded segments 415a and 415b. How occlusions are accounted for in the model, in some embodiments, is explained below.

Probability data 420 illustrates that, in some embodiments, risk estimation module 220 keeps track of two different probability estimates for each discretized road segment over time (the snapshot shown in FIG. 4 represents the two probability estimates for the various segments of a given lane l at a particular time instant t). For a given lane l, occupancy of a segment i by an external road agent at a time t can be denoted as a Boolean random variable $C_i^t \in \{0, 1\}$. The estimated probability of occupancy in segment i at time t is denoted $P(C_i^t)$, the first of the two probability estimates mentioned above. For a given lane l, the occurrence of a traffic conflict at a time t can be denoted by a Boolean random variable $E_i^t \in \{0,1\}$. The second probability that risk estimation module 220 estimates and propagates through time is the probability of a traffic conflict occurring in the respective segments conditioned on whether an external road agent is present in the respective segments, denoted, for a segment i at a time t, as $P(E_i^t | C_i^t)$. As indicated in FIG. 4, in some embodiments, the model also includes a forward distance 425 ($d_s^F$), a comfortable stopping distance that vehicle 100 maintains between itself and the vehicle it is following in the new lane after vehicle 100 has entered the new lane.

Figure 5:
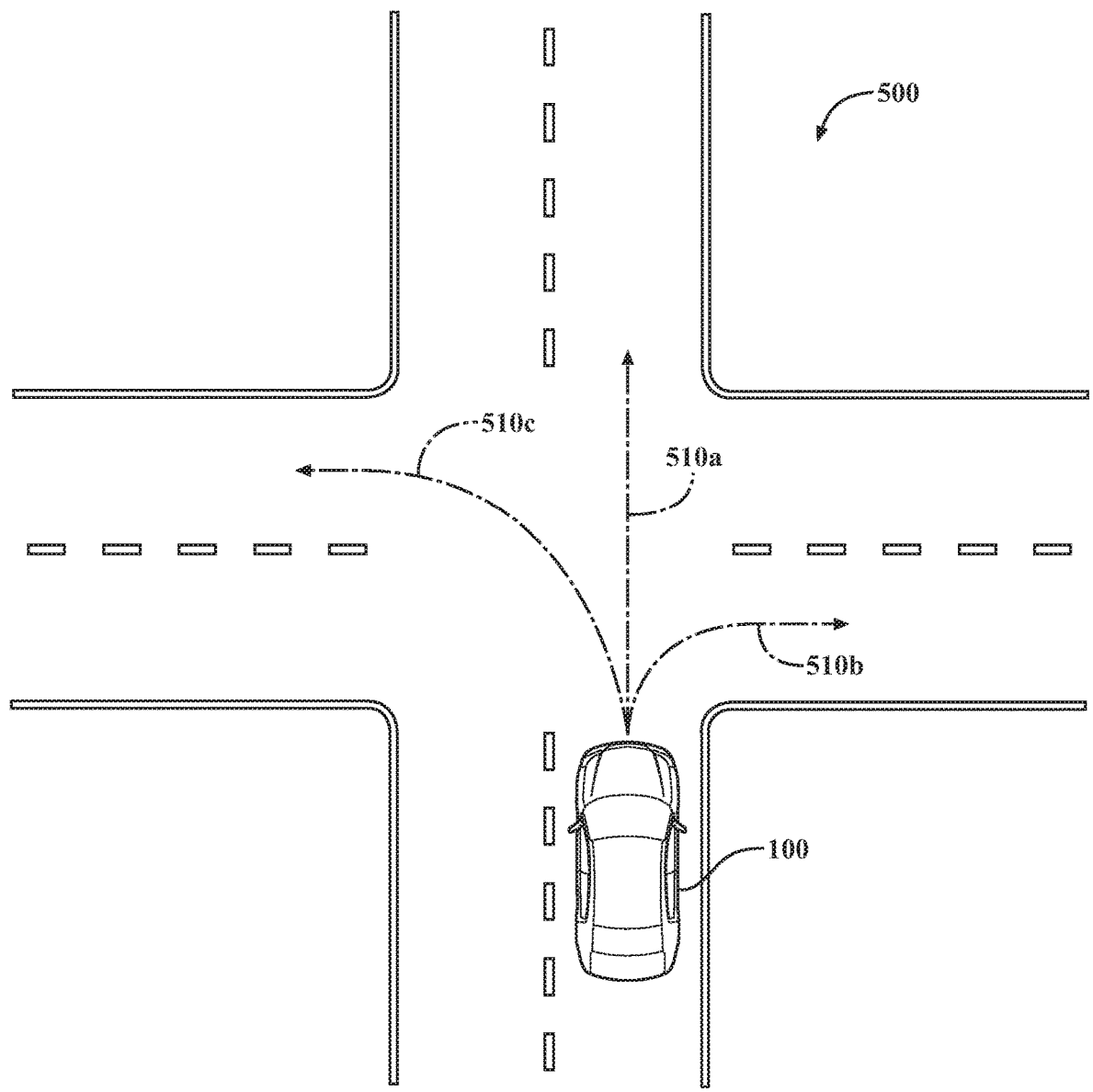
FIG. 5 illustrates some possible trajectories for an ego vehicle at an intersection, in accordance with an illustrative embodiment of the invention.

As mentioned above, another aspect of risk estimation module 220 is determining a trajectory along which vehicle 100 (the ego vehicle) will travel relative to the intersection. FIG. 5 illustrates some possible trajectories for an ego vehicle at an intersection 500, in accordance with an illustrative embodiment of the invention. In the example of FIG. 5, the ego vehicle (vehicle 100) is approaching intersection 500. Upon reaching intersection 500, three of the possible trajectories vehicle 100 could follow are trajectory 510a (proceed straight), trajectory 510b (right turn), and trajectory 510c (left turn). Risk estimation module 220 determines a particular trajectory along which vehicle 100 will travel relative to the intersection 500. In some embodiments, this trajectory is deterministic (known) because vehicle 100 is operating in an autonomous driving mode in accordance with a planned route input to or generated by navigation system 147 (see FIG. 1). In other embodiments, a human driver is at least partially in control of vehicle systems 140 such as steering, acceleration, and braking, and the route is unknown to risk estimation module 220. In those embodiments, risk estimation module 220 or another functional unit of vehicle 100 can estimate a trajectory using a physics-based model, probabilistic trajectory-prediction techniques (e.g., based on deep learning), or a combination thereof.

As mentioned above, another aspect of risk estimation module 220 is estimating a probability density function for whether a road agent external to vehicle 100 is present in the respective segments based, at least in part, on sensor data from sensor system 120. In some embodiments, the likelihood of occupied segments is modeled as a dynamic Bayesian network. The probability of segment occupancy depends on the velocity and traffic. Refer to the notation introduced in connection with the discussion of FIG. 4 above. For segment occupancy $C_i^t$, the estimated probability of occupancy $P(C_i^t)$ is conditioned on the occupancy of surrounding segments at the previous time step, notated as $P(C_i^{t+1}|C^t)$, where $C^t$ denotes the surrounding segments. At the lane origin (see FIGS. 3A, 3B, and 3C for examples), the probability of occupancy can be modeled as a homogeneous Poisson emission rate with $P(C_{0,i}^t)$ initialized to emission rate $\lambda_l$.

In some embodiments, traffic in a given lane l is assumed to have an average velocity $v_l$, as discussed above, and variations in the actual velocity at individual segments are modeled as being normally distributed, such that $v \sim \mathcal{N}(v_l, \sigma_l)$. In those embodiments, risk estimation module 220 computes $P(C_i^{t+1}|C^t) = \Sigma_m P(C_{i-m}^t) K_m$, where $K_m$ is the discrete convolution kernel defined according to $\sigma_l$.

Figure 6:
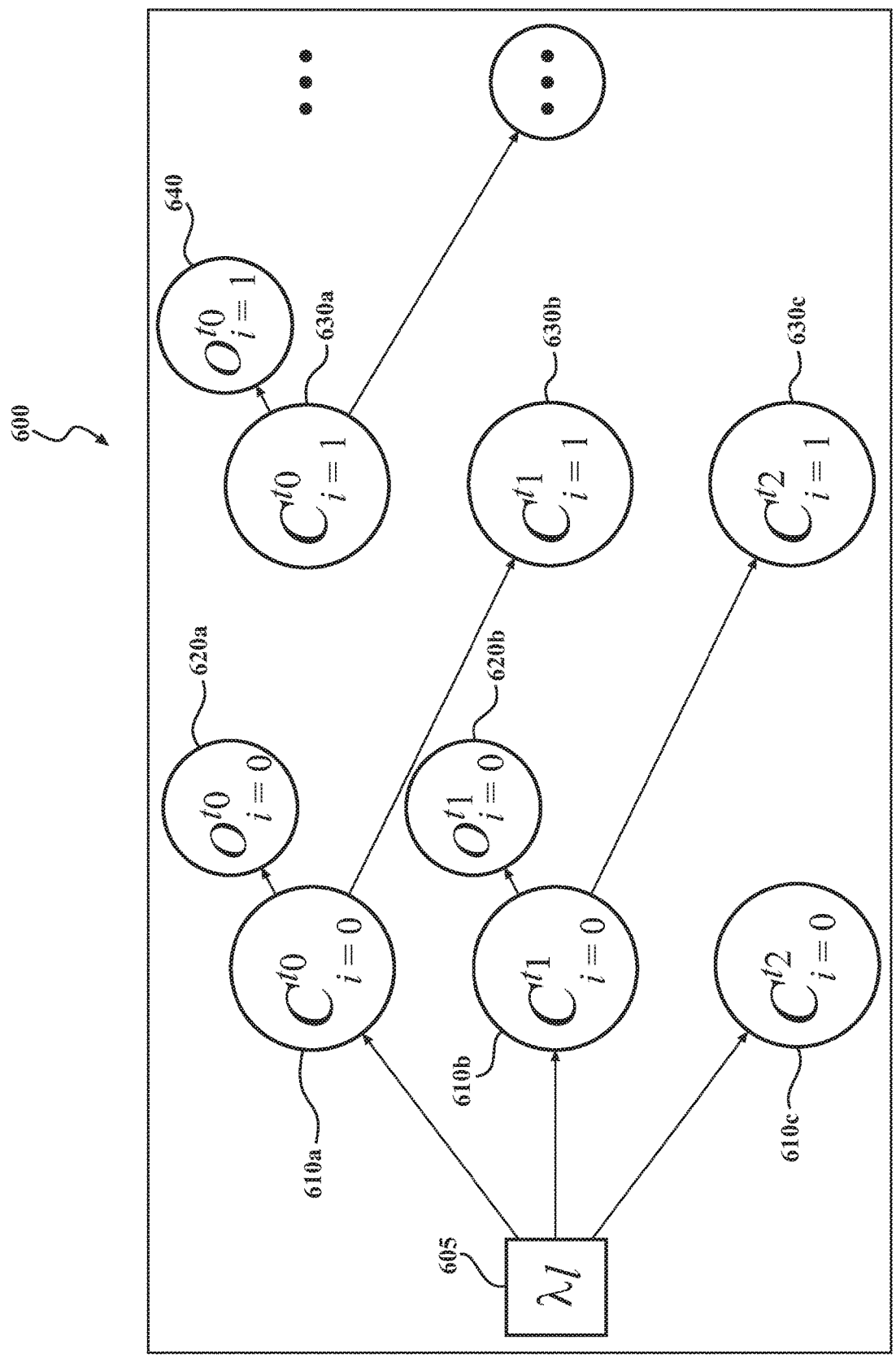
FIG. 6 is a diagram of a dynamic Bayesian network, in accordance with an illustrative embodiment of the invention.

FIG. 6 is a diagram of a dynamic Bayesian network 600, in accordance with an illustrative embodiment of the invention. FIG. 6 illustrates some of the concepts discussed above. Bayesian network 600 includes Poisson emission rate 605 ($\lambda_l$), estimated vehicle-presence probabilities 610a, 610b, and 610c, vehicle observations 620a and 620b, estimated vehicle-presence probabilities 630a, 630b, and 630c, and vehicle observation 640. FIG. 6 illustrates how the estimated occupancy probabilities are propagated for the various segments in a lane over time, accounting also for observations of external road agents in the respective segments. In the embodiment of FIG. 6, the observation of an external road agent in segment i of a given lane l at a time t is denoted by the Boolean random variable $O_i^t \in \{0,1\}$.

In some embodiments, to account for occlusions and noisy observations of external road agents, risk estimation module 220 computes the likelihood of an observation conditioned on the presence of a vehicle at segment i with probability $P(O_{i,l}^t | C_{i,l}^t)$ by incorporating both occlusions and a model of noisy observations. For an environment with $n_O$ occlusions, let $\Omega_k$ for $k = \{1, \ldots, n_O\}$ represent an occlusion. In these embodiments, an occlusion is defined as blocking some segments a to b from the ego vehicle's viewpoint, denoted as $\Omega_k = (d_k^a, d_k^b]$ (see examples of occlusions in FIG. 4). The set of all occlusions can be referred to as $\Omega$, and the notation $i \in \Omega$ can be used to indicate that a segment i is occluded from view. For occluded segments, $P(O_i^t | C_i^t, i \in \Omega) = 0$.

For unoccluded segments, in some embodiments, risk estimation module 220 models standard perception and tracking pipelines with noisy observations. Observed external road agents can be associated with a single segment in the applicable lane, and a belief update (estimated probability) for segment occupancy can be computed as follows for unoccluded $i \notin \Omega$:

$$P(C_i^t = 1 \mid O_i^t, i \notin \Omega) = \frac{P(O_i^t \mid C_i^t = 1)P(c_i^t = 1)}{\sum_{j \in [0,1]} P(O_i^t \mid C_i^t = j)P(c_i^t = j)}, \quad (1)$$

where $P(C_i^t=1)$ is computed based on the distribution of $v_i$ and the belief (estimated probability) from the previous time step.

As mentioned above, another aspect of risk estimation module 220 is estimating a traffic-conflict probability, as a result of vehicle 100 traveling along the determined trajectory, of a traffic conflict occurring in the respective segments conditioned on whether an external road agent is present in the respective segments. In some embodiments, risk estimation module 220, using the probability of the occurrence of a traffic conflict in each lane, computes the expected number of traffic conflicts or "risk." The expected risk from lane l is the inner product of the conditional risk and the external-road-agent occupancy estimate:

$$\mathbb{E}_l[E^t \mid O^{-t}] = \Sigma_i P(E_i^t \mid C_i^t) P(C_i^t \mid O^{-t}), \quad (2)$$

where $P(C_i^t \mid O^{-t})$ denotes the estimated probability of the occupancy of an external road agent in segment i given observations until time t at all segments observed by the ego vehicle (vehicle 100).

In some embodiments, in connection with computing the conditional probability of a traffic conflict in the respective segments, risk estimation module 220 also accounts for driver attention—whether the driver or operator of an external road agent notices the ego vehicle when the ego vehicle enters the intersection. Failure of an external-road-agent driver/operator to notice and react to the ego vehicle may result in a traffic conflict, as may the failure of an external road agent to act on its observations of the ego vehicle due to adverse environmental conditions such as inclement weather. In some embodiments, risk estimation module 220 incorporates driver attentiveness in its estimates of the conditional risk of a traffic conflict, $P(E_i \mid C_i)$. In some embodiments, risk estimation module 220 also accounts for, in the model, the failure of an external road agent to act on its observations of the ego vehicle (vehicle 100) due to environmental conditions such as inclement weather (e.g., snowy/icy conditions make it impossible for the external road agent to brake within a safe distance). Consider an ego vehicle at a distance $d_i$ from the intersection. Let $t_c$ denote the time it takes the ego vehicle to clear the intersection, which is a function of the trajectory length through the intersection and the vehicle's velocity $v_e$. In the embodiments incorporating driver attentiveness, the conditional risk is defined as follows:

$$P(E_i \mid C_i) = \begin{cases} 0 & d_i > v_l \cdot t_c \\ 1 & d_i < d_s \\ \exp(-\lambda_a(d_i - d_s)) & \text{otherwise} \end{cases} \quad (3)$$

where $\lambda_a > 0$ is a parameter modeling the attentiveness of the driver or operator of an external road agent, and $d_s$, as discussed above, is the comfortable stopping distance for the external road agent.

Figure 7:
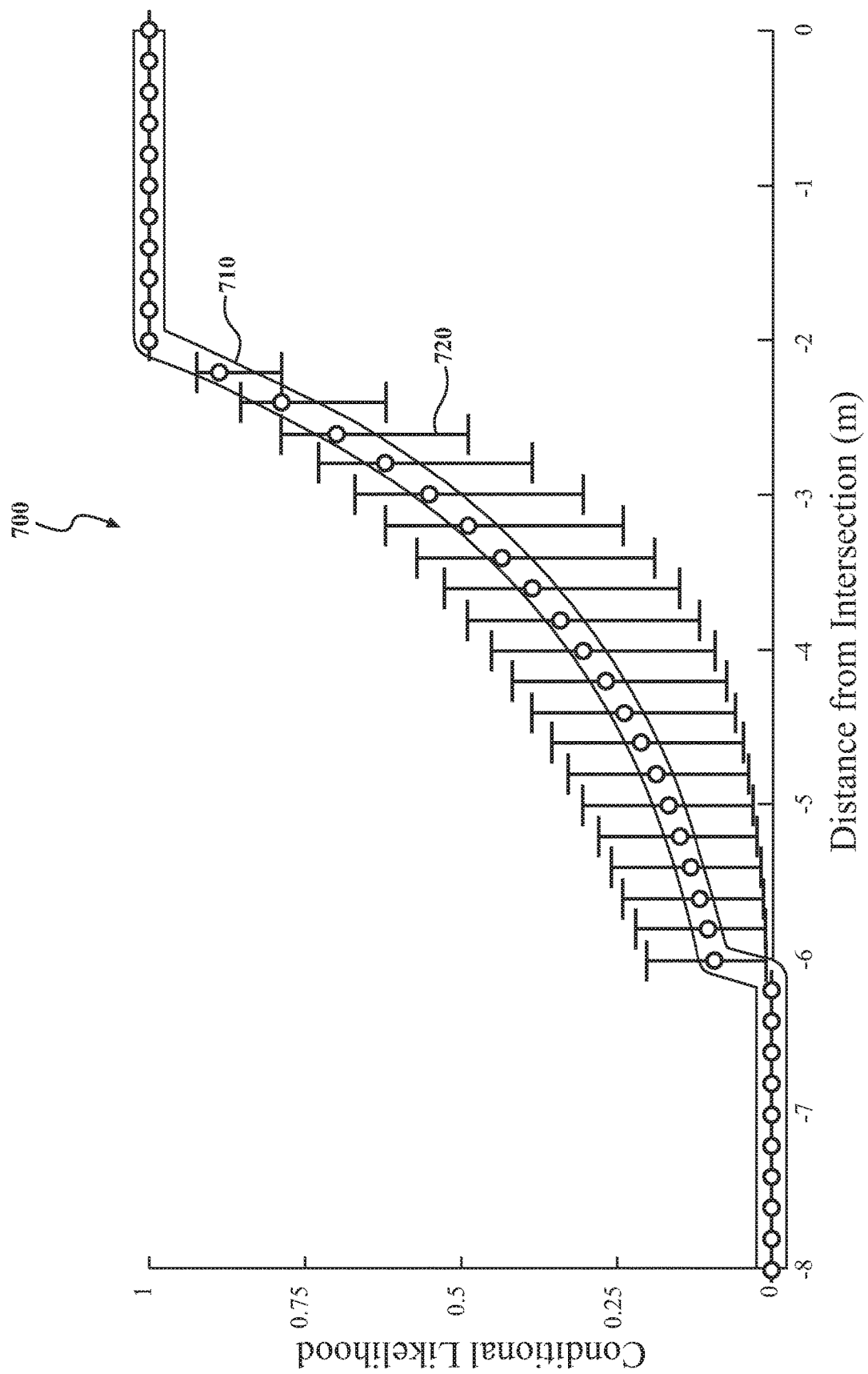
FIG. 7 is a graph of the conditional risk of an ego vehicle crossing a lane of traffic as a function of the distance of the ego vehicle from the intersection, in accordance with an illustrative embodiment of the invention.

If the external road agent will take longer than $t_c$ to arrive at the intersection, $P(E_i \mid C_i)=0$. Conversely, if the external road agent is closer to the intersection than its comfortable stopping distance $d_s$, $P(E_i \mid C_i)=1$. This does not necessarily mean that a collision will occur, but other types of traffic conflicts such as cut-offs, tailgating, or other unsafe conditions are likely. FIG. 7 is a graph of the conditional risk of an ego vehicle (vehicle 100) crossing a lane of traffic as a function of the distance $d_i$ of the ego vehicle from the intersection, in accordance with an illustrative embodiment of the invention. The conditional risk plotted in FIG. 7 corresponds to Equation 3 above. FIG. 7 includes a constant-velocity curve 710 and a curve showing a distribution of velocity 720. In some embodiments, constant velocity is assumed for expected risk. In other embodiments, velocity is statistically modeled, as discussed above.

As mentioned above, another aspect of risk estimation module 220 is estimating the risk associated with vehicle 100 traveling along the determined trajectory by integrating the product of the probability density function and the traffic-conflict probability over the lanes and the plurality of segments in each lane. In some embodiments, this overall estimated risk is computed as follows:

$$r_t = \Sigma_{l=1}^{n_l} \Sigma_{i=1}^{n_s} \mathcal{N}[E_{l,i}^t \mid O^{-t}], \quad (4)$$

where $O^{-t}$ denotes the observations seen until time t over all lanes $n_l$.

Referring to the discussion of Equations 1-4 above, an algorithm for the estimation of the overall risk $r_t$ ("Algorithm 1") can be summarized as follows:

---

Input: Observations at time t
Output: Overall risk estimate at time t
  for t = 1.. do
    Update estimates of $P(C_i)$ according to Equation 1
    Compute conditional risks $P(E_i \mid C_i)$ according to Equation 3
    for all $t_c$ do
      for all l do
        Integrate risk, finding $\mathbb{E}_l[E^t \mid O^{-t}]$ per Equation 2
      end for
      Integrate to find overall risk $r_t$ according to Equation 4
    end for
  end for

---

The estimated overall risk $r_t$ according to Equation 4 may be viewed as an upper bound on the expected number of traffic conflicts.

Control module 230 generally includes instructions that cause the one or more processors 110 to control the operation of the vehicle 100 based, at least in part, on the estimated risk $r_t$. Controlling the operation of vehicle 100 can be done in different ways, depending on the particular embodiment. In one category of embodiments, control module 230 includes instructions to control at least steering, acceleration, and braking of vehicle 100 when it is operating in an autonomous driving mode. As discussed above, control module 230 can accomplish this by communicating with autonomous driving module(s) 160 (see FIG. 2). In another category of embodiments, control module 230 includes instructions to share control of at least one of steering, acceleration, and braking of the vehicle between a human driver and ADAS 180. In some embodiments, based at least in part on the estimated risk, control module 230 can, when necessary in conjunction with ADAS 180, temporarily take full control of steering, acceleration, and/or braking to assist a human driver in avoiding a traffic conflict. Some examples of how control module 230 can control the operation of vehicle 100 in an autonomous driving mode or a shared-control (parallel-autonomy) mode are discussed below.

In some embodiments, control module 230 leverages the risk model discussed above for control policies before and after vehicle 100 enters an intersection. Before vehicle 100 reaches the intersection, control module 230 uses the estimated risk output by risk estimation module 220 to determine whether it can proceed or whether it needs to "nudge" toward the intersection to reduce uncertainty. Once vehicle 100 (the ego vehicle) has entered the intersection, control module 230 can use the estimated risk to adjust the velocity of vehicle 100 as it proceeds along the determined trajectory through the intersection. Nudging into intersections is discussed first below, followed by a discussion of clearing the intersection.

In some embodiments, a control policy for "go/no-go" and nudging into intersections can be summarized as (1) control module 230 causing vehicle 100, upon reaching the intersection, to proceed at a target speed along the determined trajectory, when the estimated risk does not exceed a predetermined threshold; and (2) control module 230 causing vehicle 100, before vehicle 100 has reached the intersection (e.g., within a predetermined nudging distance), to reduce its speed relative to the target speed, when the estimated risk exceeds the predetermined threshold. One illustrative implementation of this kind of control policy is described below.

As vehicle 100 approaches an intersection with occlusions on either side of its original lane, the risk decreases as vehicle 100 gets closer to the intersection because more road segments become visible to a human driver and/or the sensors in sensor system 120. The risk is dependent on the time $t_c$ it takes vehicle 100 to clear the intersection. In some embodiments, in the presence of occlusions or noisy observations, control module 230 controls the operation of vehicle 100 such that vehicle 100 spends time in high-visibility positions to reduce uncertainty in the estimated occupancy of the segments by external road agents, $C_{i,j}$. To reduce uncertainty and prevent risky "go/no-go" decisions, some embodiments employ the following control policy prior to vehicle 100 reaching the intersection:

$$v'_e = \begin{cases} \frac{d_e}{d_{nudge}} v_e & (r_t > r_{go}) \text{ and } (d_e < d_{nudge}) \\ v_e & \text{otherwise} \end{cases} \quad (5)$$

where $v'_e$ is the regulated velocity controlled by control module 230, bounded by the original desired or "target" velocity $v_e$, $d_e$ is the distance of vehicle 100 from the intersection, $d_{nudge}$ is the distance from the intersection at which vehicle 100 begins to nudge toward the intersection, and $r_{go}$ is a predetermined risk threshold. In these embodiments, when $d_e > d_{nudge}$ or the risk is low, the regulated or adjusted velocity matches the target velocity. Thus, $v'_e = v_e$. Otherwise, vehicle 100 slows to a stop before the intersection while gathering more observations.

The control policy for clearing the intersection after vehicle 100 has entered the intersection can be summarized, in some embodiments, as control module 230 adjusting the vehicle's speed along the determined trajectory after the vehicle has entered the intersection. One illustrative implementation of this kind of control policy is described below.

Once the estimated risk $r_t < r_{go}$, vehicle 100 enters the intersection and follows the determined trajectory to clear the intersection. Let $L_p$ represent the length of the remaining trajectory or "path" p from the original lane to the new lane through the intersection. In some embodiments, it is assumed that vehicle 100 cannot move backward along its trajectory/path, meaning that $L_p$ monotonically decreases over time. The minimum time it takes vehicle 100 to cross the intersection is given by $$t_c^{min} = \frac{L_p}{v^{max}}$$

for some maximum velocity $v^{max}$. The maximum time to clear the intersection, while keeping the estimated risk $r_t$ below the predetermined threshold $r_{go}$, is $t_c^{max}$ and depends on other traffic approaching the intersection. In some embodiments, control module 230 imposes an upper bound on $t_c^{max}$ to require vehicle 100 to clear the intersection and not to stop within the intersection. In some embodiments, control module 230 applies the following control policy after vehicle 100 has entered the intersection:

$$v'_e = \max\left(\frac{L_p}{t_c^{max}}, v_e\right).$$

In some embodiments, the nudging and clearing control policies discussed above are combined in a single algorithm in which it is assumed that the trajectory (turning path p) through the intersection is known and that a Pure Pursuit algorithm, which is known to those skilled in the art, is used to control the steering commands $\theta_e$ to vehicle 100. This algorithm ("Algorithm 2") can be summarized as follows:

---

Input: Turning path p, target velocity $v_e$
Output: Steering commands $\theta_e$ and modified velocity $v'_e$ commands
    while $L_p > 0$ do
        Update the estimated risk according to Algorithm 1
        if Before intersection ($d_e < 0$) then
            Bound velocity $v_e$ to $v'_e$ according to Equation 5
        else
            Bound velocity $v_e$ to $v'_e$ according to Equation 6
        end if
        Find pure pursuit steering $\theta_e$ based on p
        Command vehicle according to $v'_e$ and $\theta_e$
    end while

---

Figure 8:
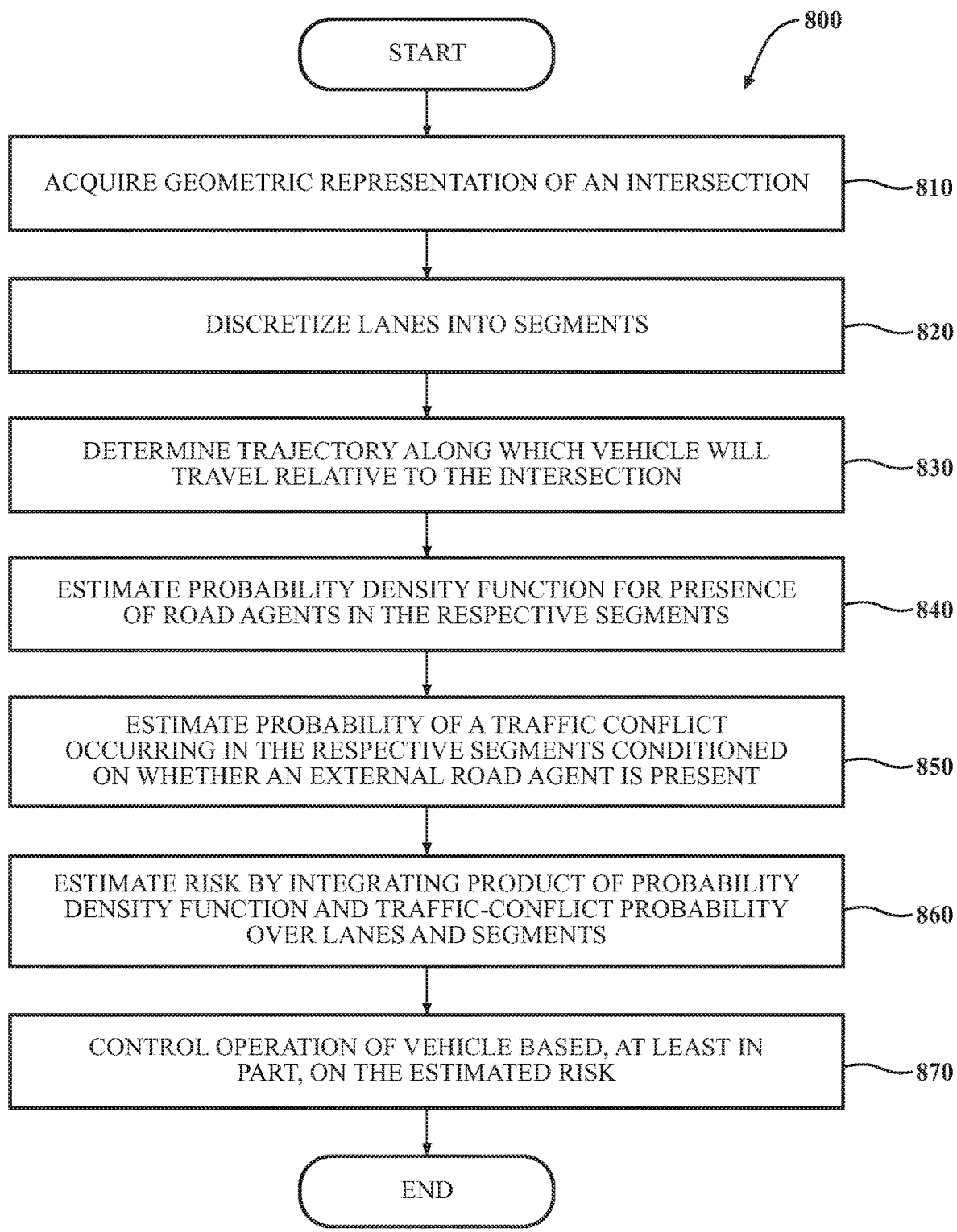
FIG. 8 is a flowchart of a method of estimating the risk associated with a vehicular maneuver, in accordance with an illustrative embodiment of the invention.

FIG. 8 is a flowchart of a method 800 of estimating the risk associated with a vehicular maneuver, in accordance with an illustrative embodiment of the invention. Method 800 will be discussed from the perspective of intersection management system 170 in FIG. 2. While method 800 is discussed in combination with intersection management system 170, it should be appreciated that method 800 is not limited to being implemented within intersection management system 170, but intersection management system 170 is instead one example of a system that may implement method 800.

At block 810, risk estimation module 220 acquires a geometric representation of an intersection, the geometric representation including a lane in which vehicle 100 (the ego vehicle) is traveling and at least one other lane. Examples of geometric representations for three different common types of intersections are discussed above in connection with FIGS. 3A, 3B, and 3C. At block 820, risk estimation module 220 discretizes the at least one other lane into a plurality of segments. Some of those segments can be occluded, as discussed above in connection with FIG. 4.

At block 830, risk estimation module 220 determines a trajectory along which the vehicle will travel relative to the intersection. As discussed above, the trajectory can be deterministic or predicted, depending on the particular embodiment (e.g., whether vehicle 100 is operating in an autonomous driving mode in accordance with a known route or in a shared-control or manual driving mode in which the route is unknown).

At block 840, risk estimation module 220 estimates a probability density function for whether a road agent external to the vehicle is present in the respective segments based, at least in part, on sensor data from sensor system 120. In one embodiment, the estimated probability density function is computed according to Equation 1, as discussed above.

At block 850, risk estimation module 220 estimates a traffic-conflict probability, as a result of the vehicle traveling along the determined trajectory, of a traffic conflict occurring in the respective segments conditioned on whether an external road agent is present in the respective segments. In one embodiment, traffic-conflict probabilities are estimated according to Equation 3, as discussed above.

At block 860, risk estimation module 220 estimates the risk associated with the vehicle traveling along the trajectory by integrating a product of the probability density function and the traffic-conflict probability over the at least one other lane and the plurality of segments. In one embodiment, this integration is calculated according to Equation 4, as discussed above (see also Equation 2, which shows the integration of the inner product of the estimated conditional traffic-conflict probability and the estimated probability density function for external-road-agent segment occupancy for a given lane l).

At block 870, control module 230 controls operation of the vehicle based, at least in part, on the estimated risk. As discussed above, in one category of embodiments, control module 230 includes instructions to control at least steering, acceleration, and braking of vehicle 100 when it is operating in an autonomous driving mode. Control module 230 can accomplish this by communicating with autonomous driving module(s) 160 (see FIG. 2). In another category of embodiments, control module 230 includes instructions to share control of at least one of steering, acceleration, and braking of the vehicle between a human driver and ADAS 180.

Figure 9:
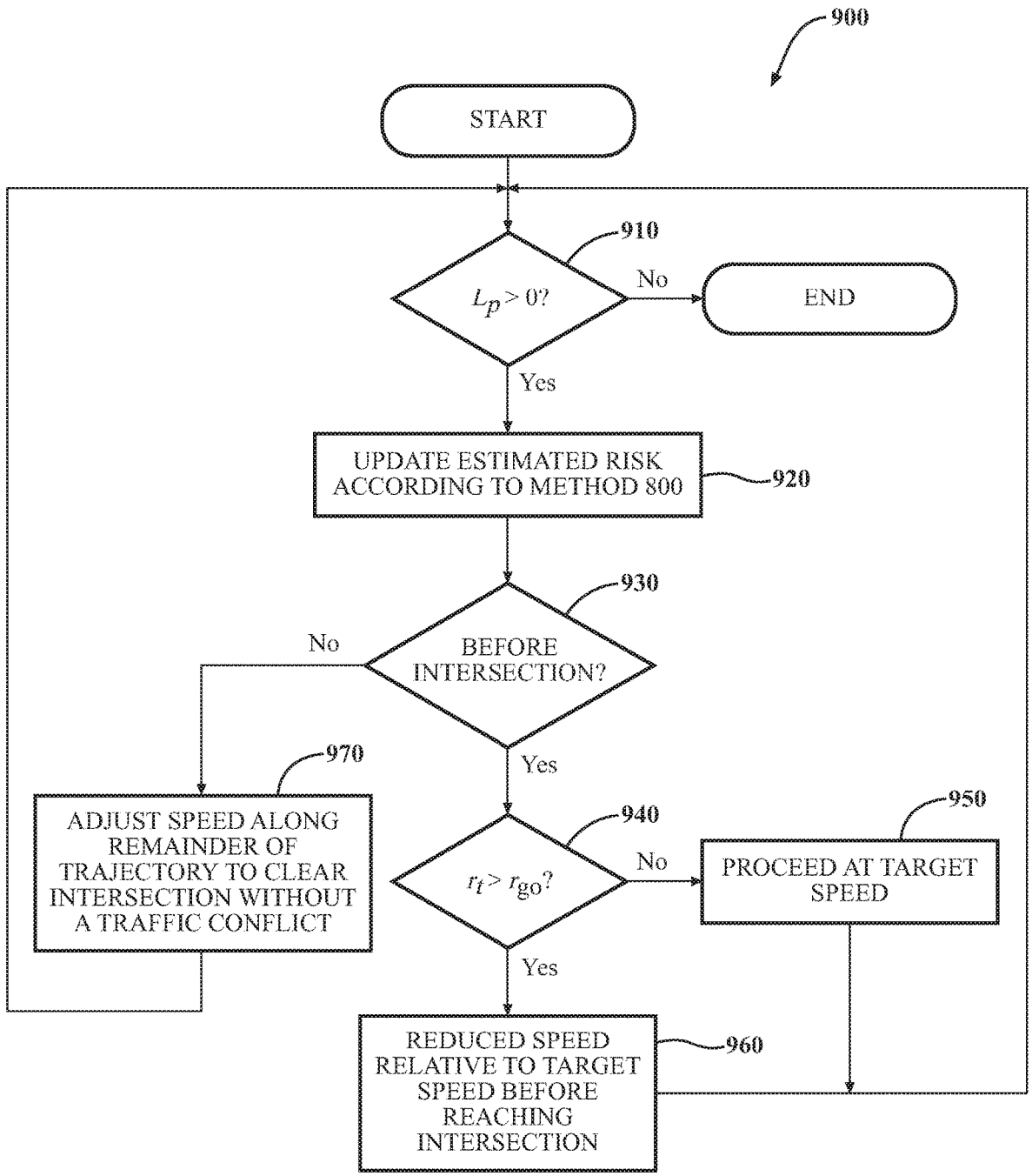
FIG. 9 is a flowchart of a method of controlling the operation of a vehicle based, at least in part, on the estimated risk associated with the vehicle traveling along a determined trajectory, in accordance with an illustrative embodiment of the invention.

FIG. 9 is a flowchart of a method of controlling the operation of a vehicle based, at least in part, on the estimated risk associated with the vehicle traveling along a determined trajectory, in accordance with an illustrative embodiment of the invention. Method 900 will be discussed from the perspective of intersection management system 170 in FIG. 2. While method 900 is discussed in combination with intersection management system 170, it should be appreciated that method 900 is not limited to being implemented within intersection management system 170, but intersection management system 170 is instead one example of a system that may implement method 900.

At decision block 910, if vehicle 100 has not yet completed its trajectory (also referred to sometimes above as "path" p) through the intersection, the method proceeds to block 920. Otherwise, the method terminates. At block 920, risk estimation module 220 updates the estimated risk in accordance with blocks 810-860 of method 800 above. At decision block 930, if vehicle 100 has not yet reached the intersection, control module 230 determines, at decision block 940, whether the current estimated risk $r_t$ exceeds a predetermined threshold $r_{go}$. If not, vehicle 100 proceeds, at block 950, to enter the intersection at a target speed. If so, vehicle 100, at block 960, reduces its speed below the target speed before reaching the intersection. In some embodiments, vehicle 100 comes to a complete stop while gathering additional observations (perhaps due to occlusions at the intersection) before proceeding to enter the intersection, as discussed above. One example of a control policy for "nudging" into an intersection is discussed above in connection with Equation 5.

If, at decision block 930, vehicle 100 has already entered the intersection, control module 230, at block 970, adjusts the speed of vehicle 100 along the remainder of its trajectory so that vehicle 100 can clear the intersection without a traffic conflict. One example of a control policy for vehicle 100 to clear an intersection after vehicle 100 has entered the intersection is discussed above in connection with Equation 6.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the intersection management system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the intersection management system 170, and/or the autonomous driving module(s) 160 may control some or all of these vehicle systems 140 and, thus, may be partially or fully autonomous.

The processor(s) 110, the intersection management system 170, and/or the autonomous driving module(s) 160 can be operably connected to communicate with the various vehicle systems 140 and/or individual components thereof. For example, returning to FIG. 1, the processor(s) 110, the intersection management system 170, and/or the autonomous driving module(s) 160 can be in communication to send and/or receive information from the various vehicle systems 140 to control the movement, speed, maneuvering, heading, direction, etc. of the vehicle 100. The processor(s) 110, the intersection management system 170, and/or the autonomous driving module(s) 160 may control some or all of these vehicle systems 140.

The processor(s) 110, the intersection management system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the intersection management system 170, and/or the autonomous driving module(s) 160 can control the direction and/or speed of the vehicle 100. The processor(s) 110, the intersection management system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the intersection management system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for estimating risk associated with a vehicular maneuver, the system comprising:
   one or more sensors to produce sensor data;
   one or more processors; and
   a memory communicably coupled to the one or more processors and storing:
   a risk estimation module including instructions that when executed by the one or more processors cause the one or more processors to:
     acquire a geometric representation of an intersection, the geometric representation including a lane in which a vehicle is traveling and at least one other lane;
     discretize the at least one other lane into a plurality of segments;
     determine a trajectory along which the vehicle will travel relative to the intersection;
     estimate, at each of a plurality of adjacent discrete time steps using an Eulerian model, an updated probability density function for whether a road agent external to the vehicle is present in the respective segments in the plurality of segments based, at least in part, on the sensor data, wherein the Eulerian model partially corrects faulty perception results that are based on the sensor data;
     estimate a traffic-conflict probability, as a result of the vehicle traveling along the trajectory, of a traffic conflict occurring in the respective segments in the plurality of segments conditioned on whether an external road agent is present in the respective segments in the plurality of segments; and
     estimate a risk associated with the vehicle traveling along the trajectory by integrating a product of the probability density function and the traffic-conflict probability over the at least one other lane and the plurality of segments; and
   a control module including instructions that when executed by the one or more processors cause the one or more processors to control operation of the vehicle based, at least in part, on the estimated risk.

2. The system of claim 1, wherein the instructions included in the control module to control operation of the vehicle based, at least in part, on the estimated risk include instructions to control at least steering, acceleration, and braking of the vehicle in an autonomous driving mode of the vehicle.

3. The system of claim 1, wherein the instructions included in the control module to control operation of the vehicle based, at least in part, on the estimated risk include instructions to share control of at least one of steering, acceleration, and braking of the vehicle between an advanced driver-assistance system of the vehicle and a human driver.

4. The system of claim 1, wherein the instructions included in the risk estimation module to estimate the risk include instructions to account for an occlusion with respect to a viewpoint of the vehicle in at least one of the plurality of segments.

5. The system of claim 1, wherein the instructions included in the risk estimation module to estimate the risk include at least one of instructions to account for failure of an operator of an external road agent to observe the vehicle as the vehicle approaches the intersection along the trajectory and instructions to account for failure, due to environmental conditions, of an external road agent to act on an observation of the vehicle as the vehicle approaches the intersection along the trajectory.

6. The system of claim 1, wherein the instructions included in the control module to control operation of the vehicle based, at least in part, on the estimated risk include instructions to:
   cause the vehicle, upon reaching the intersection, to proceed at a target speed along the trajectory, when the estimated risk does not exceed a predetermined threshold; and
   cause the vehicle, before the vehicle has reached the intersection, to reduce its speed relative to the target speed, when the estimated risk exceeds the predetermined threshold.

7. The system of claim 1, wherein the instructions included in the control module to control operation of the vehicle based, at least in part, on the estimated risk include, to avoid a traffic conflict, instructions to adjust the vehicle's speed along the trajectory after the vehicle has entered the intersection.

8. The system of claim 1, wherein the intersection is unsignalized and is one of a merge, a four-way intersection, and a roundabout.

9. The system of claim 1, wherein the estimated risk is an upper bound on an expected number of traffic conflicts.

10. The system of claim 1, wherein the one or more sensors include at least one of a camera, a Light Detection and Ranging (LIDAR) sensor, a radar sensor, and a sonar sensor.

11. A non-transitory computer-readable medium for estimating risk associated with a vehicular maneuver and storing instructions that when executed by one or more processors cause the one or more processors to:

acquire a geometric representation of an intersection, the geometric representation including a lane in which a vehicle is traveling and at least one other lane;

discretize the at least one other lane into a plurality of segments;

determine a trajectory along which the vehicle will travel relative to the intersection;

estimate, at each of a plurality of adjacent discrete time steps using an Eulerian model, an updated probability density function for whether a road agent external to the vehicle is present in the respective segments in the plurality of segments based, at least in part, on sensor data, wherein the Eulerian model partially corrects faulty perception results that are based on the sensor data;

estimate a traffic-conflict probability, as a result of the vehicle traveling along the trajectory, of a traffic conflict occurring in the respective segments in the plurality of segments conditioned on whether an external road agent is present in the respective segments in the plurality of segments;

estimate a risk associated with the vehicle traveling along the trajectory by integrating a product of the probability density function and the traffic-conflict probability over the at least one other lane and the plurality of segments; and control operation of the vehicle based, at least in part, on the estimated risk.

12. The non-transitory computer-readable medium of claim 11, wherein the instructions to control operation of the vehicle based, at least in part, on the estimated risk include instructions to:

cause the vehicle, upon reaching the intersection, to proceed at a target speed along the trajectory, when the estimated risk does not exceed a predetermined threshold; and cause the vehicle, before the vehicle has reached the intersection, to reduce its speed relative to the target speed, when the estimated risk exceeds the predetermined threshold.

13. The non-transitory computer-readable medium of claim 11, wherein the instructions to control operation of the vehicle based, at least in part, on the estimated risk include, to avoid a traffic conflict, instructions to adjust the vehicle's speed along the trajectory after the vehicle has entered the intersection.

14. A method of estimating risk associated with a vehicular maneuver, the method comprising:

acquiring a geometric representation of an intersection, the geometric representation including a lane in which a vehicle is traveling and at least one other lane;

discretizing the at least one other lane into a plurality of segments;

determining a trajectory along which the vehicle will travel relative to the intersection;

estimating, at each of a plurality of adjacent discrete time steps using an Eulerian model, an updated probability density function for whether a road agent external to the vehicle is present in the respective segments in the plurality of segments based, at least in part, on sensor data, wherein the Eulerian model partially corrects faulty perception results that are based on the sensor data;

estimating a traffic-conflict probability, as a result of the vehicle traveling along the trajectory, of a traffic conflict occurring in the respective segments in the plurality of segments conditioned on whether an external road agent is present in the respective segments in the plurality of segments;

estimating a risk associated with the vehicle traveling along the trajectory by integrating a product of the probability density function and the traffic-conflict probability over the at least one other lane and the plurality of segments; and controlling operation of the vehicle based, at least in part, on the estimated risk.

15. The method of claim 14, wherein controlling operation of the vehicle includes controlling at least steering, acceleration, and braking of the vehicle in an autonomous driving mode of the vehicle.

16. The method of claim 14, wherein controlling operation of the vehicle includes sharing control of at least one of steering, acceleration, and braking of the vehicle between an advanced driver-assistance system of the vehicle and a human driver.

17. The method of claim 14, wherein estimating the risk includes accounting for an occlusion with respect to a viewpoint of the vehicle in at least one of the plurality of segments.

18. The method of claim 14, wherein estimating the risk includes at least one of accounting for failure of an operator of an external road agent to observe the vehicle as the vehicle approaches the intersection along the trajectory and accounting for failure, due to environmental conditions, of an external road agent to act on an observation of the vehicle as the vehicle approaches the intersection along the trajectory.

19. The method of claim 14, wherein controlling operation of the vehicle includes:

causing the vehicle, upon reaching the intersection, to proceed at a target speed along the trajectory, when the estimated risk does not exceed a predetermined threshold; and causing the vehicle, before the vehicle has reached the intersection, to reduce its speed relative to the target speed, when the estimated risk exceeds the predetermined threshold.

20. The method of claim 14, wherein controlling operation of the vehicle includes, to avoid a traffic conflict, adjusting the vehicle's speed along the trajectory after the vehicle has entered the intersection.

* * * * *